United States Patent
Vandyke et al.

(10) Patent No.: US 9,546,810 B2
(45) Date of Patent: Jan. 17, 2017

(54) CO$_2$ VENTILATION BULB SEAL FOR INSULATED GALLEY CART

(71) Applicant: The Boeing Company, Chicago, IL (US)

(72) Inventors: Bryce A. Vandyke, Snohomish, WA (US); Marcus K. Richardson, Bothell, WA (US); Chao-Hsin Lin, Redmond, WA (US)

(73) Assignee: The Boeing Company, Chicago, IL (US)

( * ) Notice: Subject to any disclaimer, the term of this patent is extended or adjusted under 35 U.S.C. 154(b) by 10 days.

(21) Appl. No.: 14/202,439

(22) Filed: Mar. 10, 2014

(65) Prior Publication Data

US 2015/0253061 A1    Sep. 10, 2015

(51) Int. Cl.
| | | |
|---|---|---|
| *A47B 81/00* | (2006.01) | |
| *A24F 25/00* | (2006.01) | |
| *B01F 3/06* | (2006.01) | |
| *F25D 23/02* | (2006.01) | |
| *F25D 3/12* | (2006.01) | |
| *F25D 23/08* | (2006.01) | |
| *F16J 15/02* | (2006.01) | |
| *A47B 31/02* | (2006.01) | |
| *B64D 11/04* | (2006.01) | |

(52) U.S. Cl.
CPC ............ *F25D 23/028* (2013.01); *F25D 3/125* (2013.01); *F25D 23/087* (2013.01); *A47B 31/02* (2013.01); *B64D 11/04* (2013.01); *F16J 15/027* (2013.01)

(58) Field of Classification Search
CPC .... F25D 3/125; F25D 23/087; Y10S 277/928; Y10S 277/929; F16J 15/02; F16J 15/027; A47B 31/02
See application file for complete search history.

(56) References Cited

U.S. PATENT DOCUMENTS

| | | | | |
|---|---|---|---|---|
| 2,263,522 A | * | 11/1941 | Scott | C01B 31/22 62/165 |
| 2,910,209 A | * | 10/1959 | Nelson | A61G 17/02 220/378 |
| 2,969,252 A | * | 1/1961 | Gruver | B64C 1/14 220/378 |
| 4,892,632 A | * | 1/1990 | Morris | C25B 9/20 204/256 |
| 5,083,727 A | | 1/1992 | Pompei et al. | |
| 8,474,274 B2 | | 7/2013 | Schalla et al. | |
| 2005/0193760 A1 | * | 9/2005 | Moran | F25D 11/003 62/371 |
| 2009/0273265 A1 | * | 11/2009 | Aragon | F25D 3/125 312/405 |

(Continued)

FOREIGN PATENT DOCUMENTS

CA    2687634 A1    6/2010

*Primary Examiner* — Daniel J Troy
*Assistant Examiner* — Andres Gallego
(74) *Attorney, Agent, or Firm* — Felix L. Fischer (57) ABSTRACT

A galley cart system employs a dry ice compartment and a refrigeration compartment in a galley cart in flow communication with the dry ice compartment. A ventilation system is in interruptible flow communication with at least the refrigeration compartment and is for receiving gas discharged from at least the refrigeration compartment.

14 Claims, 14 Drawing Sheets

(56) References Cited

U.S. PATENT DOCUMENTS

2011/0277489 A1* 11/2011 Schalla .................. A47B 31/02
    62/89
2012/0007321 A1* 1/2012 Davis .................... E06B 7/2303
    277/628
2013/0239484 A1 9/2013 Chubb et al.

* cited by examiner

CO2 VENTILATION BULB SEAL FOR INSULATED GALLEY CART

REFERENCE TO RELATED APPLICATIONS

This application is copending with application Ser. No. 14/202,366 filed on Mar. 10, 2014 entitled Dry Ice Draw Through Galley Cooling and application Ser. No. 14/202,495 filed on Mar. 10, 2014 entitled CO2 Shut Off Method for Dry Ice Sublimation Inside a Galley Cart both having a common assignee with the present invention, the disclosures of which are incorporated herein by reference.

BACKGROUND INFORMATION

Field

Embodiments of the disclosure relate generally to galley cart systems for transportation vehicles and more particularly to a collapsible bulb seal with one or more orifices for collection of CO2 when expanding from a collapsed to expanded position and expulsion of CO2 when collapsing from the expanded position.

Background

Galley carts employed for food service in transportation vehicles such as aircraft and trains often require cooling to maintain food and beverages at a temperature that is cooler than a cabin of the vehicle, At least some known carts include or connect to a refrigeration system (a chiller) that provides cool air to an interior volume of the cart to cool the food/beverages. However, the chiller is powered by the vehicle systems, reducing the amount of power available to the vehicle for propulsion, thrust, etc, As such, the chiller is an inefficient draw on the power supply system of the vehicle. Further, such a chiller system adds weight and complexity to the vehicle, Accordingly, some galley carts are configured to contain dry ice that cools the food/beverages as it sublimates. One drawback with the use of dry ice is the carbon dioxide gas (CO2) sublimate that is released. At least in aircraft, the Federal Aviation Administration has set forth requirements for the maximum CO2 concentration in a cabin of the aircraft, The sublimation of the dry ice may cause the CO2 concentration in the cabin to exceed the maximum parts-per-million (ppm), For example, the CO2 gas may escape from the cart into the cabin when the door of the cart is opened in the galley area or in the aisle as food/beverages are served (a transient condition), Further, the CO2 gas may escape from the cart through provided leak paths to ensure that the pressure within the cart does not exceed a maximum threshold as the dry ice sublimates (a steady-state condition). Dry ice, providing CO2 sublimation as a coolant, is a commonly available, cost effective and volumetrically efficient refrigerant for such use. However, limiting venting of CO2 gas from the galley carts to avoid undesirable buildup of CO2 in passenger compartments is preferred.

It is therefore desirable to provide structurally simple and cost effective structure for control of $CO_2$ sublimation in galley carts.

SUMMARY

Exemplary embodiments provide a galley cart having a housing defining a cavity. A door is coupled to the housing, the door configured to be moved between a closed position and an open position. A seal assembly is coupled between the housing and the door with at least one bulb seal configured to draw gas in when the door is in the open position and to exhaust the gas when the door is in the closed position.

The embodiments provide a method for collection of $CO_2$ sublimate in a galley cart by compressing a bulb seal having at least one aperture between the galley cart door and housing. Upon opening the door, the bulb seal expands drawing in $CO_2$ sublimate into the bulb seal through the aperture. Upon closing the door, the bulb seal is compressed exhausting $CO_2$.

BRIEF DESCRIPTION OF THE DRAWINGS

The features, functions, and advantages that have been discussed can be achieved independently in various embodiments of the present invention or may be combined in yet other embodiments further details of which can be seen with reference to the following description and drawings.

DETAILED DESCRIPTION

The embodiments described herein provide a galley cart for use in a transportation vehicle that includes a seal assembly having a hollow bulb seal positioned between the cart housing and the door of the cart. The bulb seal is coupled to the housing or the door at any suitable location. In one embodiment, the bulb seal is positioned vertically along an edge of the door opposite of the door hinges. The bulb seal defines a hollow cavity, and two end caps coupled to the seal further enclose the cavity. At least one of the end caps includes at least one aperture; however, the end cap(s) can include any suitable number and/or arrangement of apertures.

When the cart door opens, the bulb seal expands and draws gas through the aperture into the seal cavity. As such, when the cart door opens, the expanding bulb seal may help prevent escape of CO2 gas into the cabin by drawing the CO2 gas, and possibly other gas, into the cavity (the CO2 gas will be near the bottom of the cart because of its relative weight). When the cart door closes, the bulb seal is compressed and exhausts the gas from the seal cavity. In the example embodiment, the bottom end cap includes the aperture(s) such that gas is exhausted out of the bottom of the cart because the gas (CO2) is heavier than the air in the cabin and the gas will be lower than a breathing height of the passengers. In alternative embodiments, the orifice in the bulb seal may be positioned to exhaust the gas back into the galley cart interior. Accordingly, the embodiments described herein may reduce CO2 in the cabin during transient conditions and may exhaust CO2 gas in a manner to avoid inhalation by the passengers. The terms "(CO2 gas", "CO2 sublimate", and "sublimate" are used interchangeably herein.

Figure 1A:
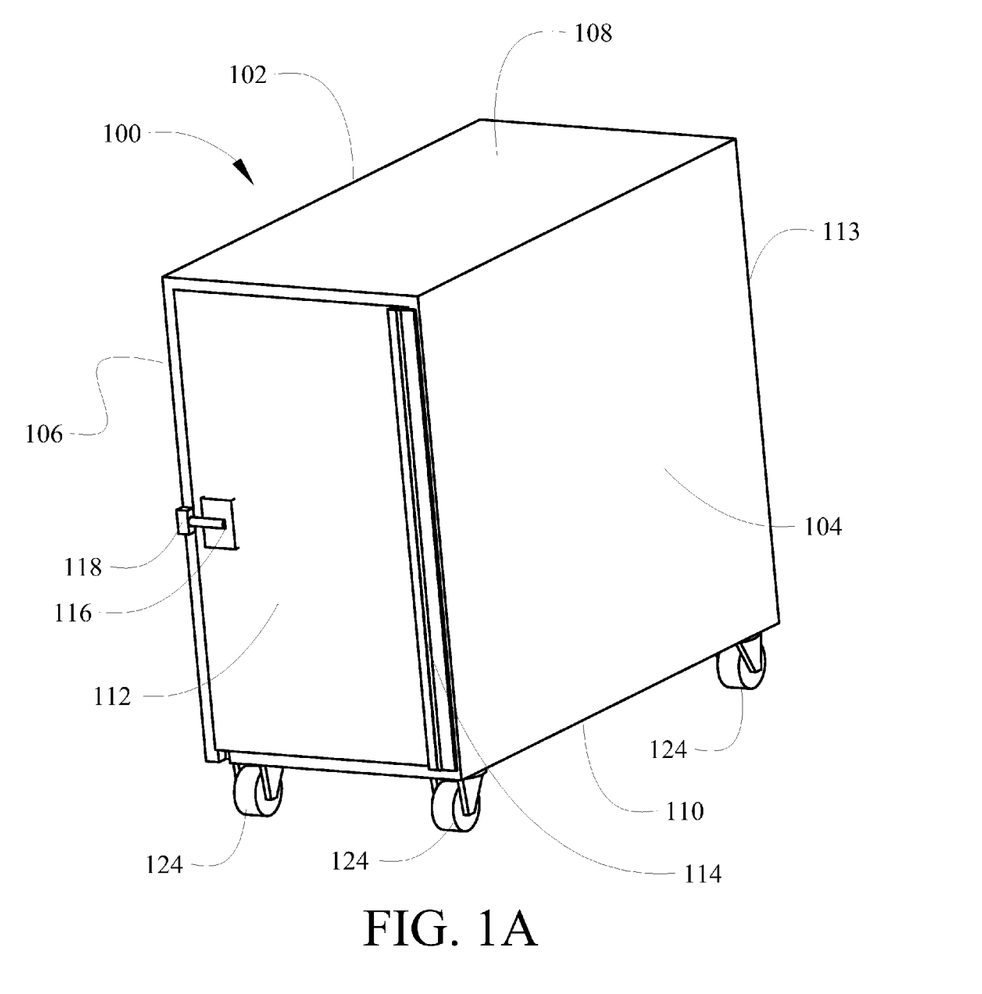
FIG. 1A is a perspective view of an example a galley cart in which the described embodiments may be employed.

Referring to the drawings, FIG. 1A is an isometric view of a galley cart 100 which may be employed in the embodiments disclosed herein. In one aspect of this embodiment, the galley cart 100 includes a housing 102. In the illustrated embodiment, the housing 102 has a first side 104, a second side 106, a top 108, and a bottom 110. The galley cart 100 further includes a first door 112 positioned on one end of the housing 102, and, for certain embodiments, a second door (not shown) is positioned on an opposite end of the case 102. Each of the doors 112 can further include one or more hinges 114 and a latch 116. The hinges 114 pivotally attach the doors 112 to the housing 102. The latch 116 can be configured to releasably engage corresponding receivers 118 attached to the housing 102 when the doors 112 are in closed positions as illustrated in FIG. 1A.

Figure 1B:
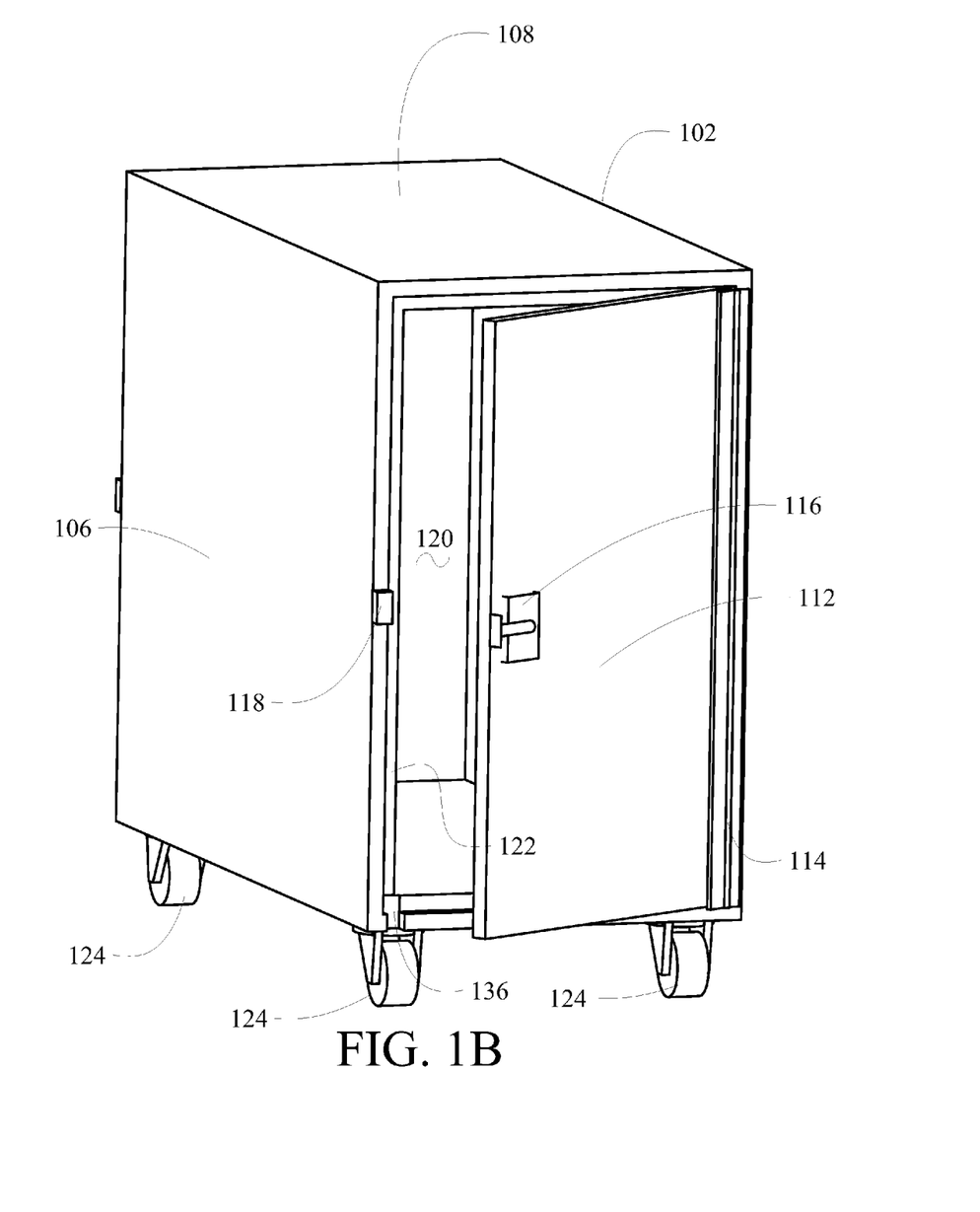
FIG. 1B is a second perspective view of the galley cart of FIG. 1A with a first door in a partially open position.

By disengaging the latch 116 from the corresponding receiver 118, the doors 112 can be opened outwardly providing access to an interior cavity 120 of the housing 102 as shown in FIG. 1B. Positioning the doors 112 at respective ends of the housing 102 allows flight attendants to conveniently access food stored within the housing 102 from either end of the galley cart 100. In other embodiments, the second door can be omitted if desired. Additionally, the doors 112 are received in a recess 122 in the housing 102 to be described in greater detail subsequently. Wheels or casters 124 allow the galley cart to be easily maneuvered within the service areas and aisles of the aircraft.

Figure 2A:
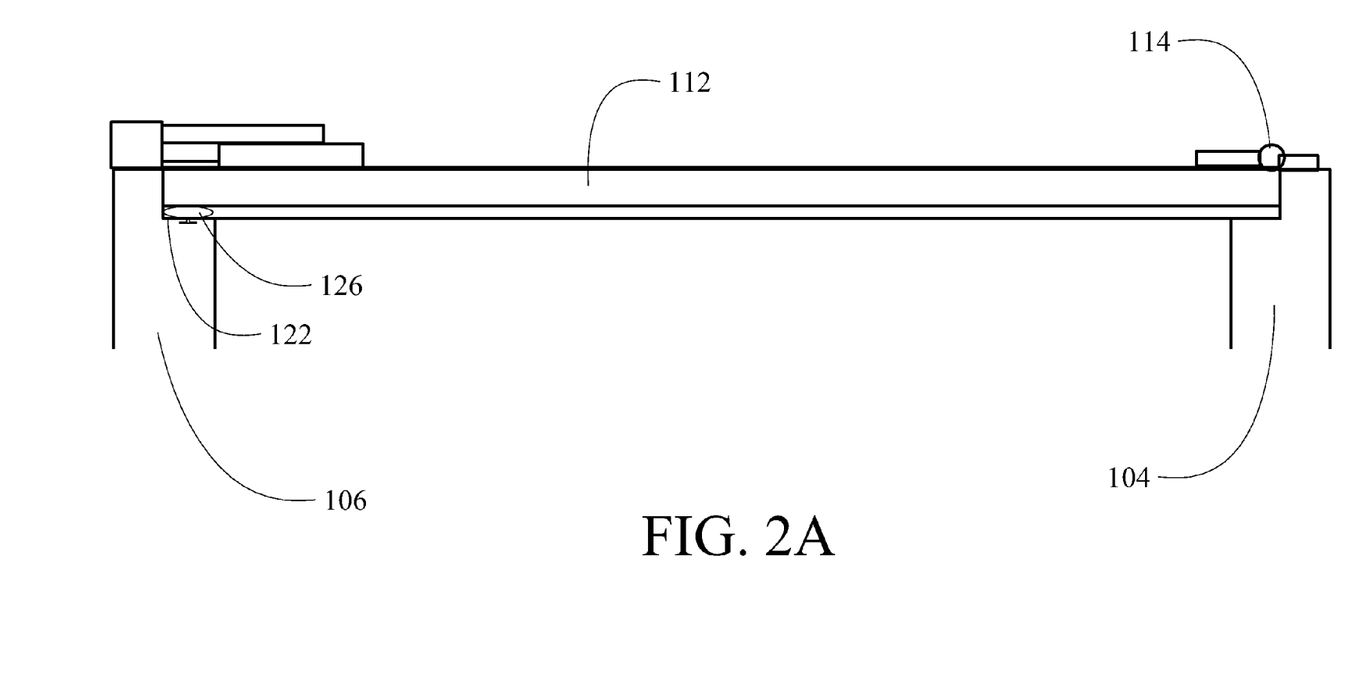
FIG. 2A is a partial bottom section view of the galley cart showing the door in a closed position with a compressed bulb seal.
Figure 2B:
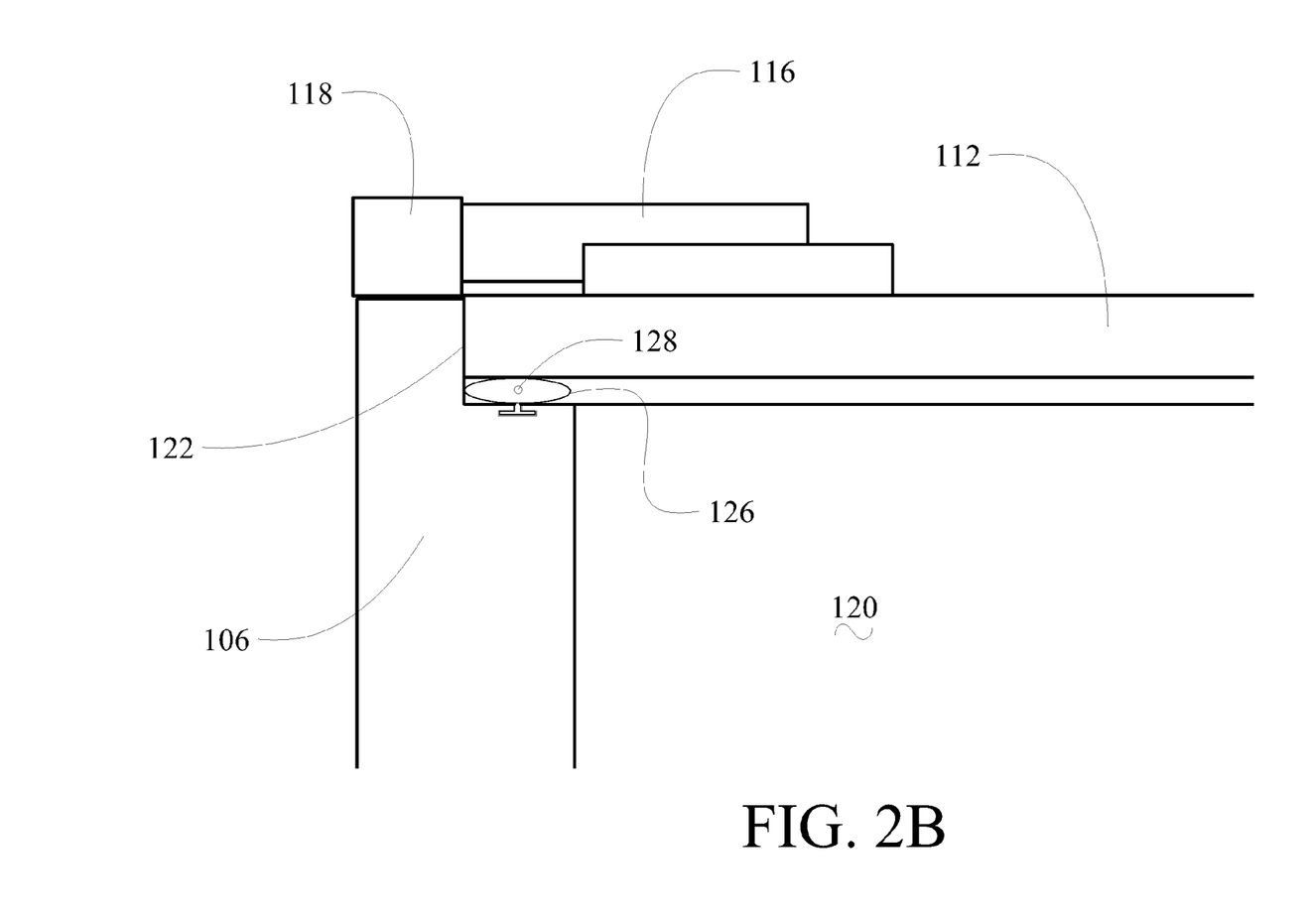
FIG. 2B is a detailed partial bottom section view of the galley cart showing the door in a closed position with a compressed bulb seal.
Figure 3A:
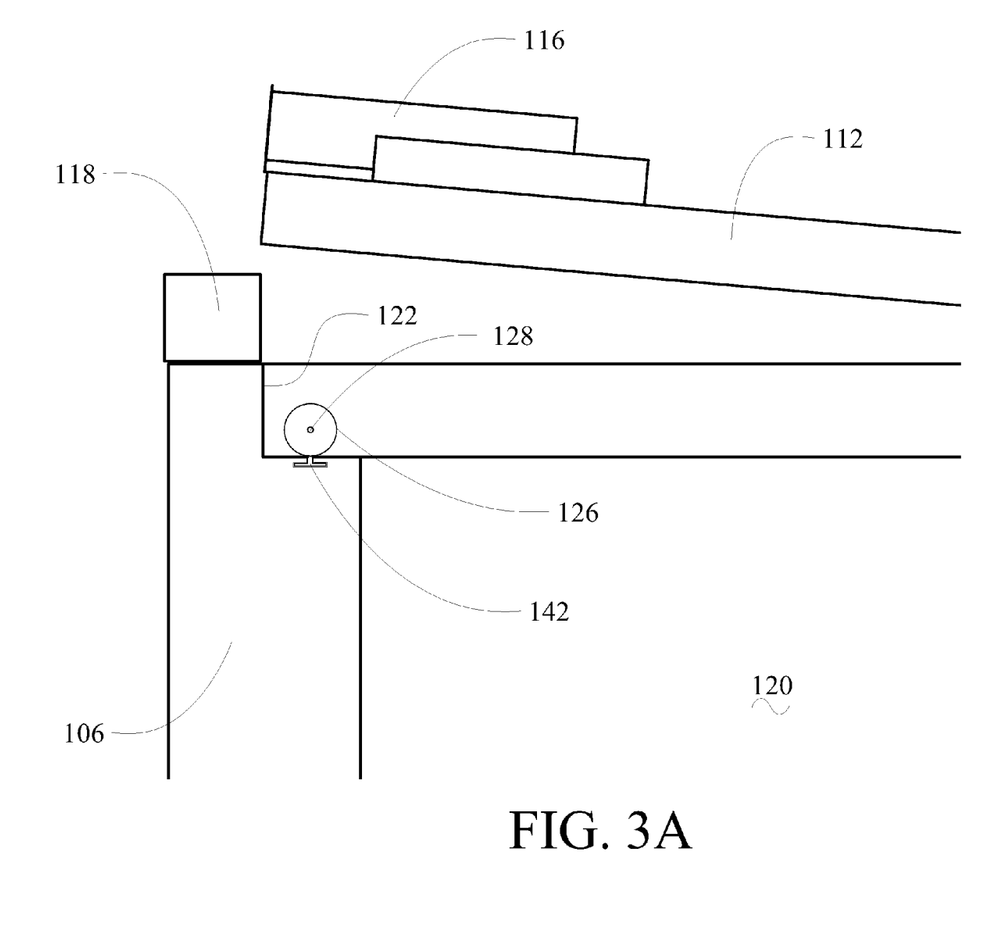
FIG. 3A is a detailed partial bottom section view of the galley cart showing the door in a partially open position for a first embodiment with the bulb seal attached to the door and with the compressed bulb seal expanded.
Figure 3B:
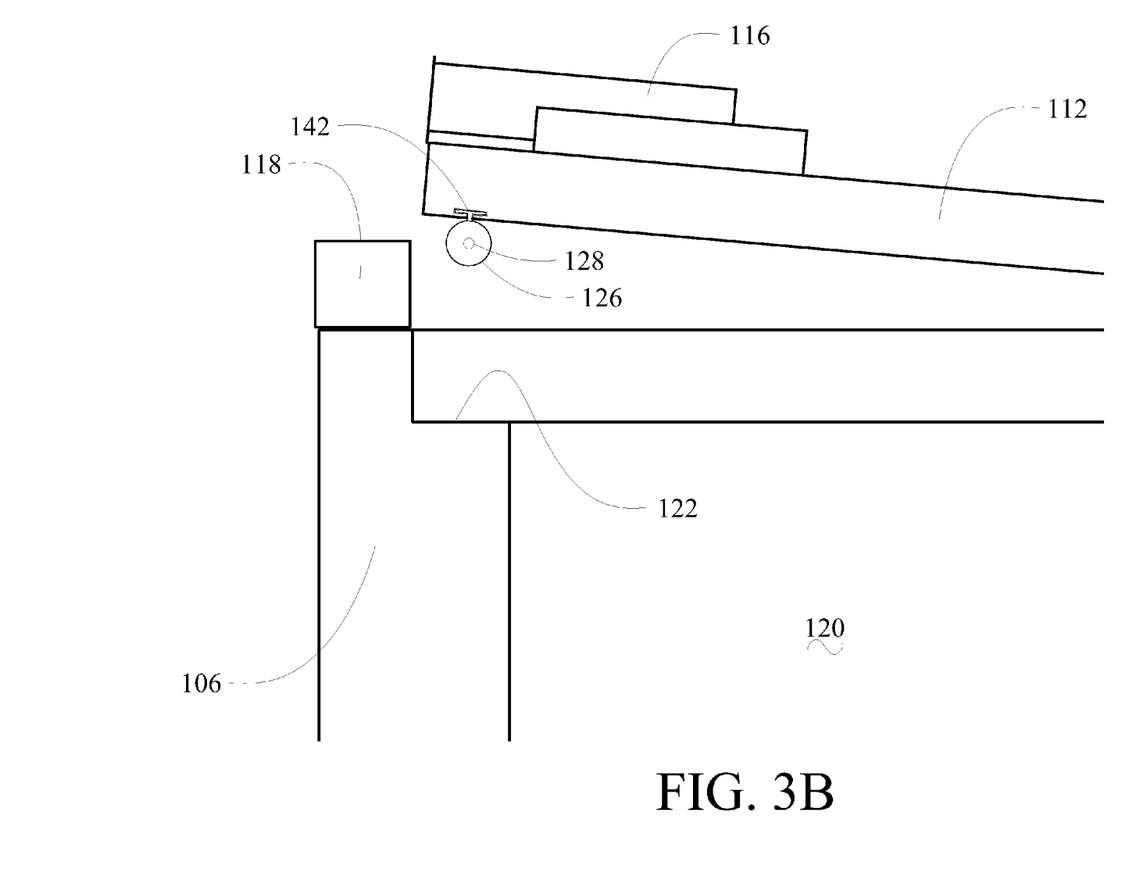
FIG. 3B is a detailed partial bottom section view of the galley cart showing the door in a partially open position for a second embodiment with the bulb seal attached to the door seal relief and with the compressed bulb seal expanded.

Dry ice may be stored in the galley cart to provide $CO_2$ sublimate in the interior cavity as a coolant for food or beverages stored in the cart. The $CO_2$ sublimate will tend to pool near the bottom of the interior cavity 120 in the cart. A hollow bulb seal 126 is mounted in the recess 122 into which the doors 112 are received as shown in FIGS. 2A, 2B and 3A or 3B. In the embodiment shown, the bulb seal 126 is mounted in the recess 122 opposite the hinge attachment. With the door 112 in a closed position, the bulb seal is compressed as shown in FIGS. 2A and 2B. With the door open as shown in FIGS. 3A or 3B, the bulb seal is expanded. The bulb seal 126 may be attached to the recess 122 as in FIG. 3A or to the door 112 as in FIG. 3B. An aperture 128 placed in a bottom cap 130 of the bulb seal 126, shown in detail in FIG. 4, provides a port into which gas, such as $CO_2$ gas, in the cart is drawn during opening of the door 112.

Figure 5A:
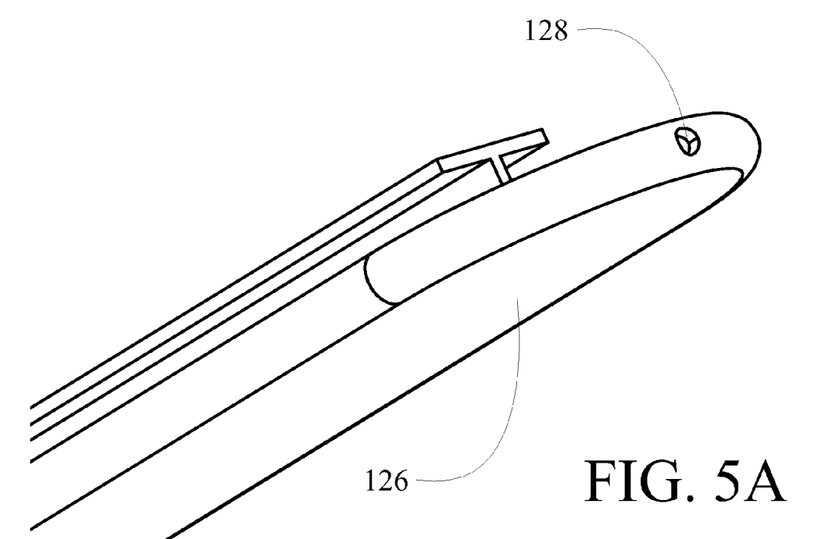
FIG. 5A is a partial bottom perspective view of the bulb seal showing the compressed seal and orifice.
Figure 5B:
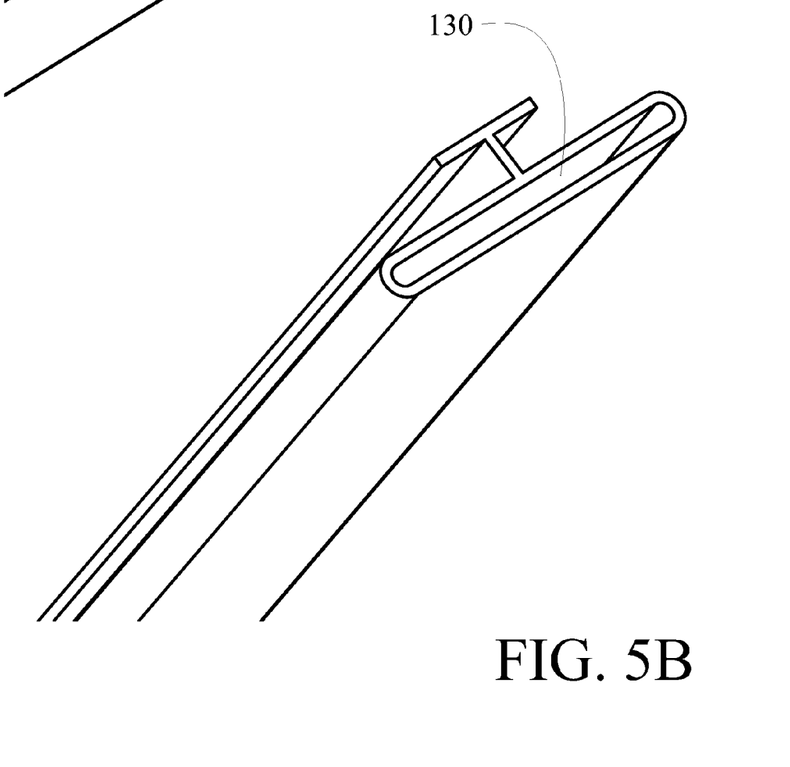
FIG. 5B is a section view of the bulb seal of FIG. 5A demonstrating the interior volume of the compressed seal.
Figure 6A:
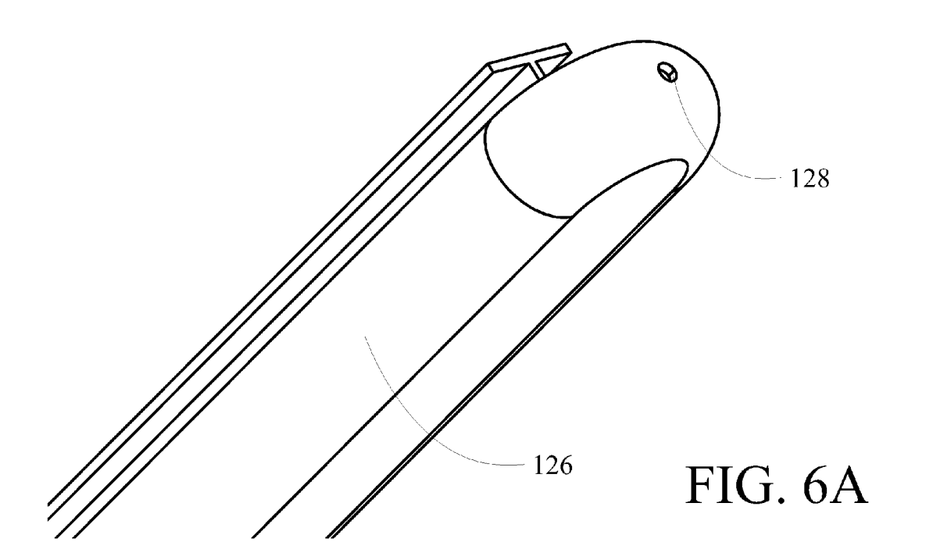
FIG. 6A is a partial bottom perspective view of the bulb seal showing the partially compressed seal and orifice.
Figure 6B:
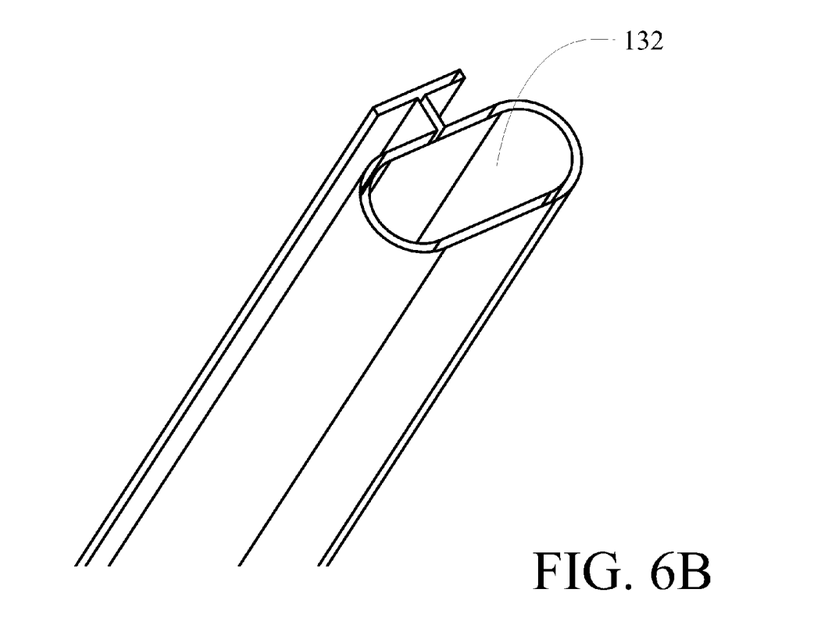
FIG. 6B is a section view of the bulb seal of FIG. 6A demonstrating the interior volume of the partially compressed seal.
Figure 7A:
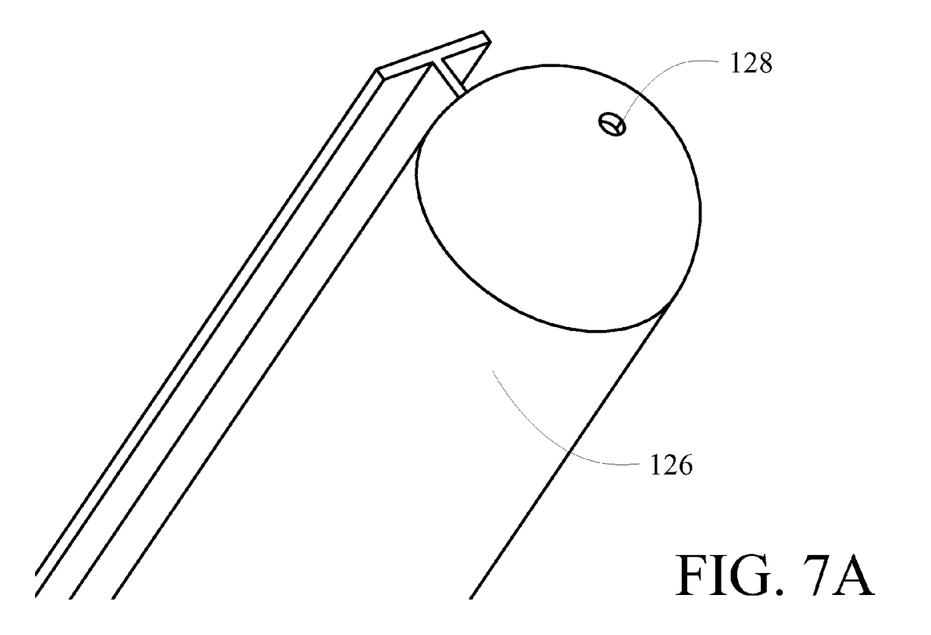
FIG. 7A is a partial bottom perspective view of the bulb seal showing the fully expanded seal and orifice.
Figure 7B:
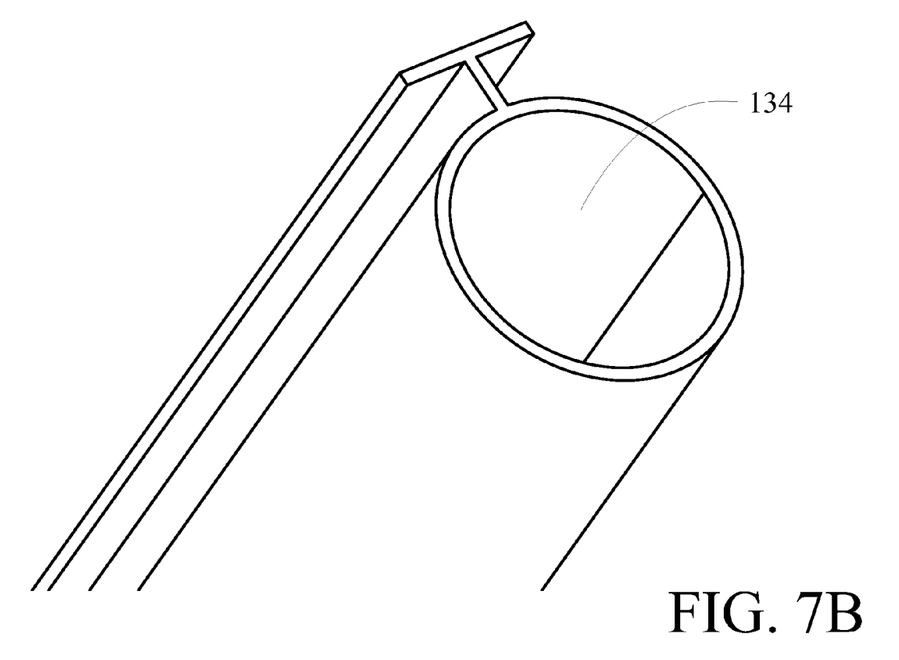
FIG. 7B is a section view of the bulb seal of FIG. 7A demonstrating the interior volume of the fully expanded seal.

Opening of the door 112 results in the bulb seal 126 transitioning from a compressed condition to an expanded condition thereby increasing interior volume and creating a reduced pressure within the bulb seal. This transition is shown in FIGS. 5A, 5B, 6A, 613, 7A and 7C. In FIG. 5A the bulb seal 126 is in a compressed condition with a resulting cross sectional area 130 as shown in FIG. 5B. As the door 112 is opened, the bulb seal begins to expand as shown in FIG. 6A, resulting in an increased cross sectional area 132 as shown in FIG. 613. The increased cross sectional area results in a greater volume within the bulb. When fully expanded as shown in FIGS. 7A and 7B, the maximum cross sectional area 134 results. The perimeter of the seal remains the same but internal volume (and vacuum) increases when removing compression in the system.

Upon closing the door 112, the bulb seal 126 is recompressed expelling the accumulated CO2 gas. A relief channel 136 (seen in FIG. 1B) may be provided to vent the CO2 gas from the compressing of bulb seal downward from the bottom 110 of the cart. This release of CO2 gas at essentially floor level may preclude undesirable distribution of CO2 to be breathed by passengers in the vehicle.

Figure 4:
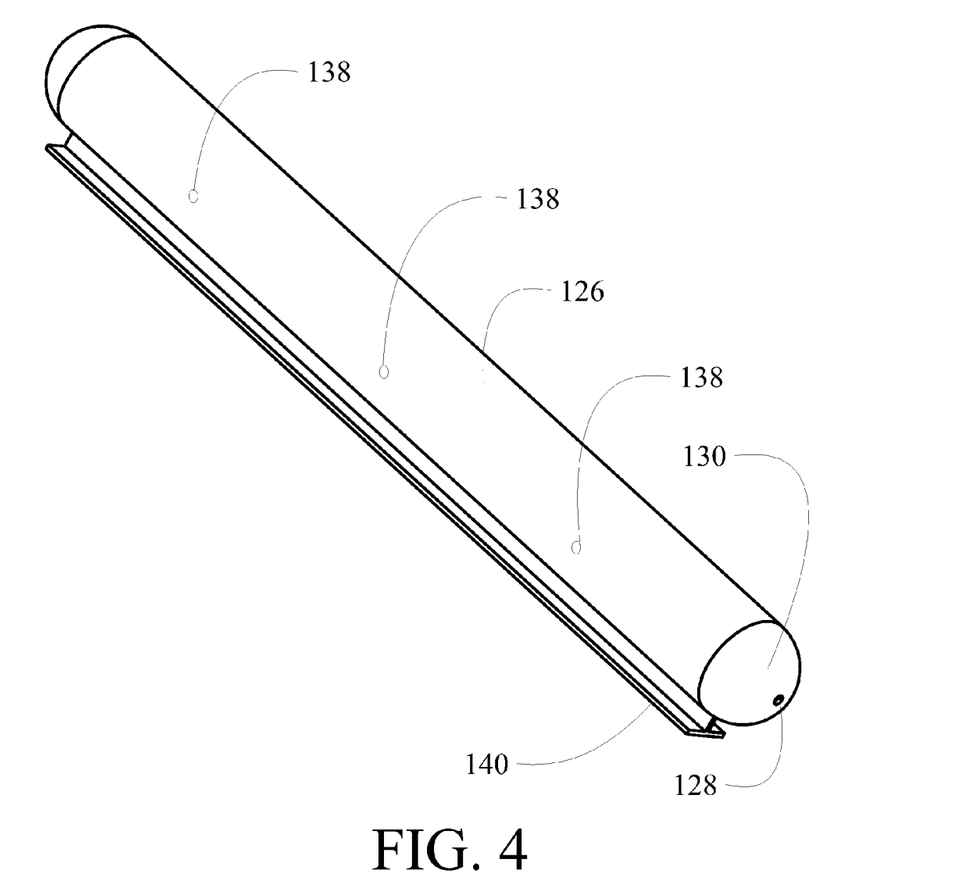
FIG. 4 is a perspective view of an example bulb seal.

As shown in FIG. 4, additional apertures 138 may be provided along the length of the bulb seal to draw $CO_2$ gas into the expanding seal from a greater portion of the interior cavity of the cart.

Figure 8:
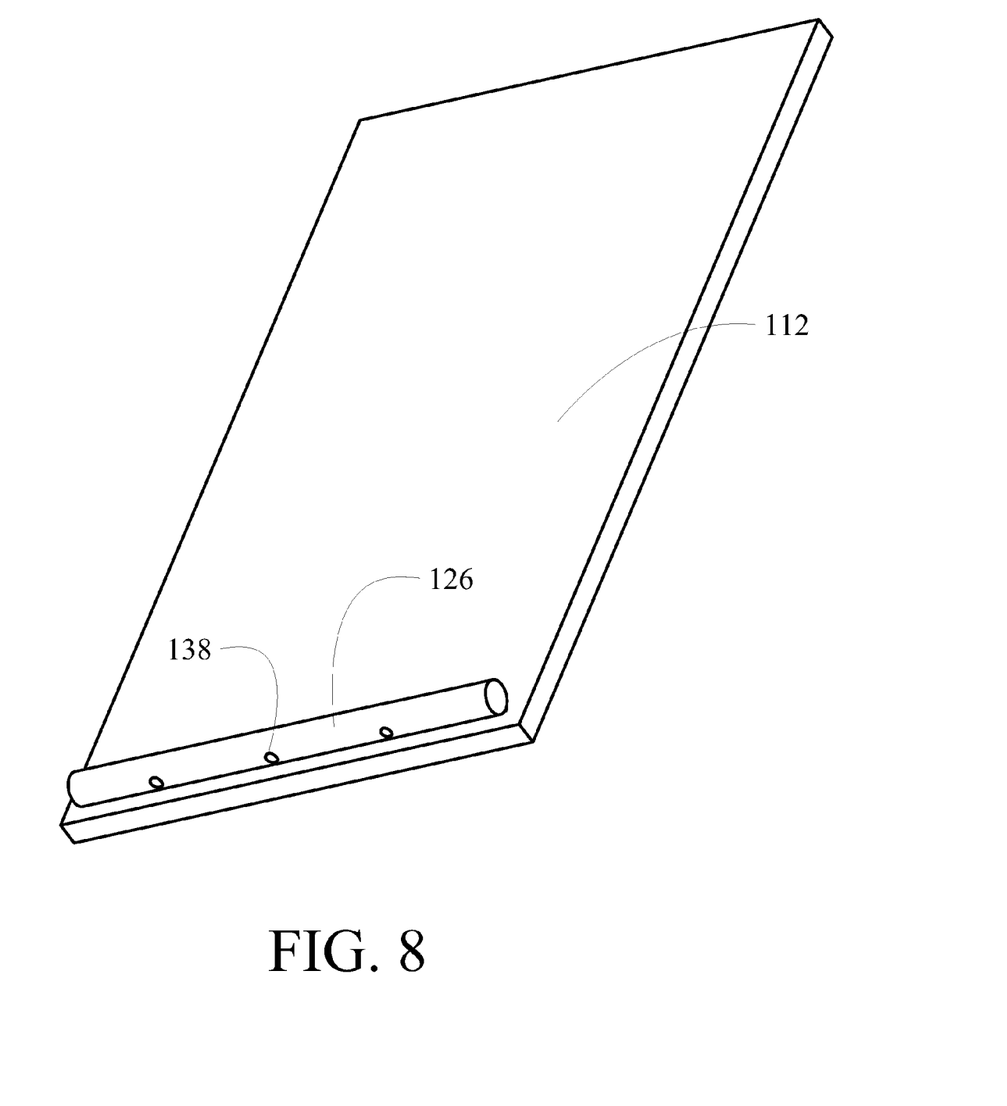
FIG. 8 is an interior perspective view of the door with a bottom bulb seal.
Figure 9:
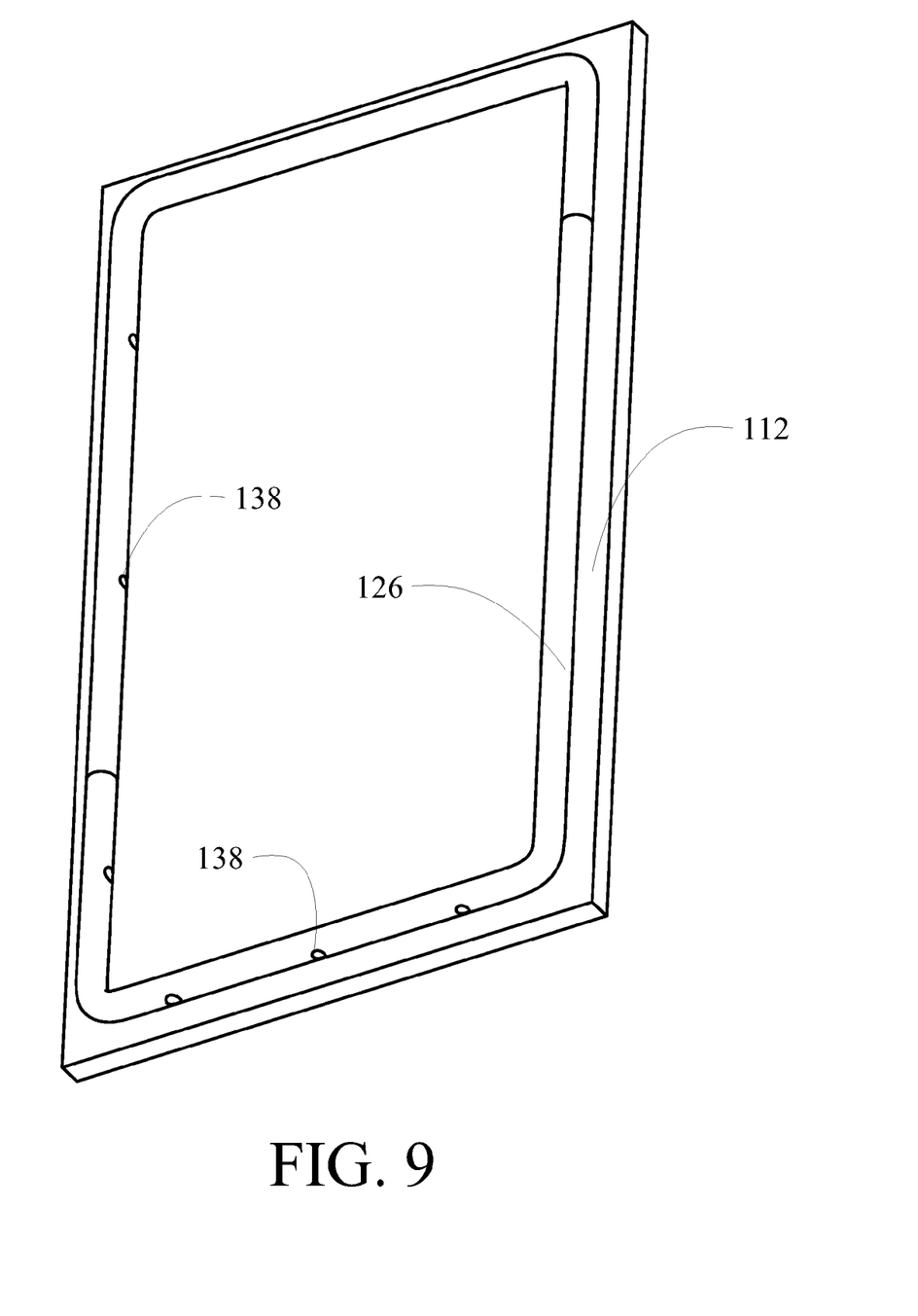
FIG. 9 is an interior perspective view of the door with a peripheral bulb seal.

In an alternative embodiment, the bulb seal 126 may be placed along the bottom edge of the door 112 and cart housing 102 as shown in FIG. 8 with apertures 138 as shown in FIG. 4 oriented along the bottom of the door. In another alternative embodiment, the bulb seal 126 may extend around the door 112 as a complete peripheral seal around the door 112 as shown in FIG. 9. Multiple apertures 138 may be directed downward for collecting $CO_2$ gas from the lower portion of the internal cavity as the door 112 is opened expanding the seal and exhausting the $CO_2$ gas downward as the door is closed compressing the seal. Additional apertures along the periphery for collecting $CO_2$ gas from within the internal cavity may also be provided.

In other alternative embodiments, the bulb seal may be positioned with the apertures in communication with the interior cavity 120 to exhaust the collected $CO_2$ gas back into the interior volume upon closing of the door 112.

Figure 10:
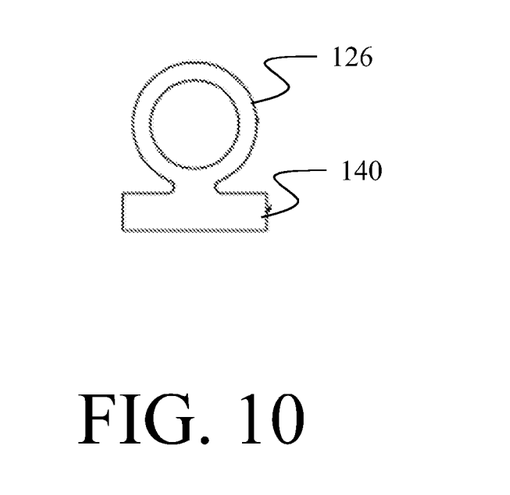
FIG. 10 is a cross section of a bulb seal with a first exemplary attachment tab.
Figure 11:
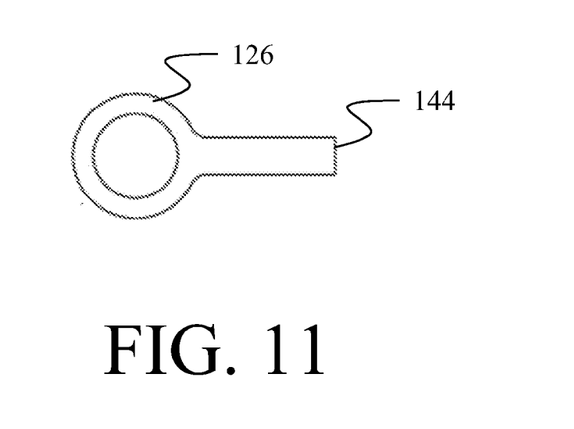
FIG. 11 is a cross section of a bulb seal with a second exemplary attachment tab.
Figure 12:
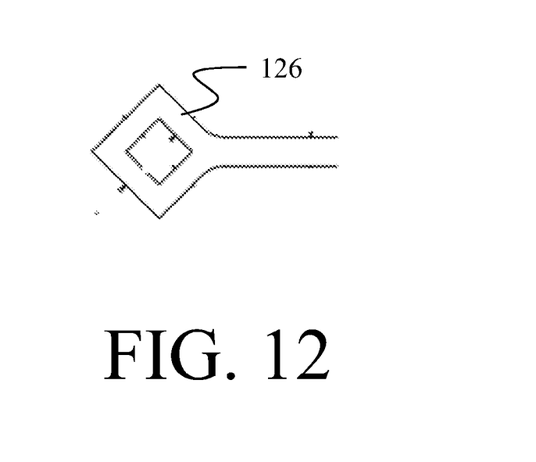
FIG. 12 a cross section of a bulb seal with an alternative shape and attachment tab; and, FIG. 13 is a flow chart of a $CO_2$ capture method enabled by the disclosed embodiments.

As shown in FIG. 4 and FIG. 10, the seal assembly may incorporate a T-rib 140 for attachment of the bulb seal 126 to the galley cart door or recess. As seen in FIGS. 3A and 3B, the T-rib 140 is received within a T-slot 142 in either the recess 122 or door 112 to constrain the bulb seal 126. An alternative attachment of the bulb seal may be accomplished with a flat flange 144 as shown in FIG. 11. Alternative cross sectional shapes may also be employed for the bulb seal such as a rectangular seal 146 as shown in FIG. 12.

Figure 13:
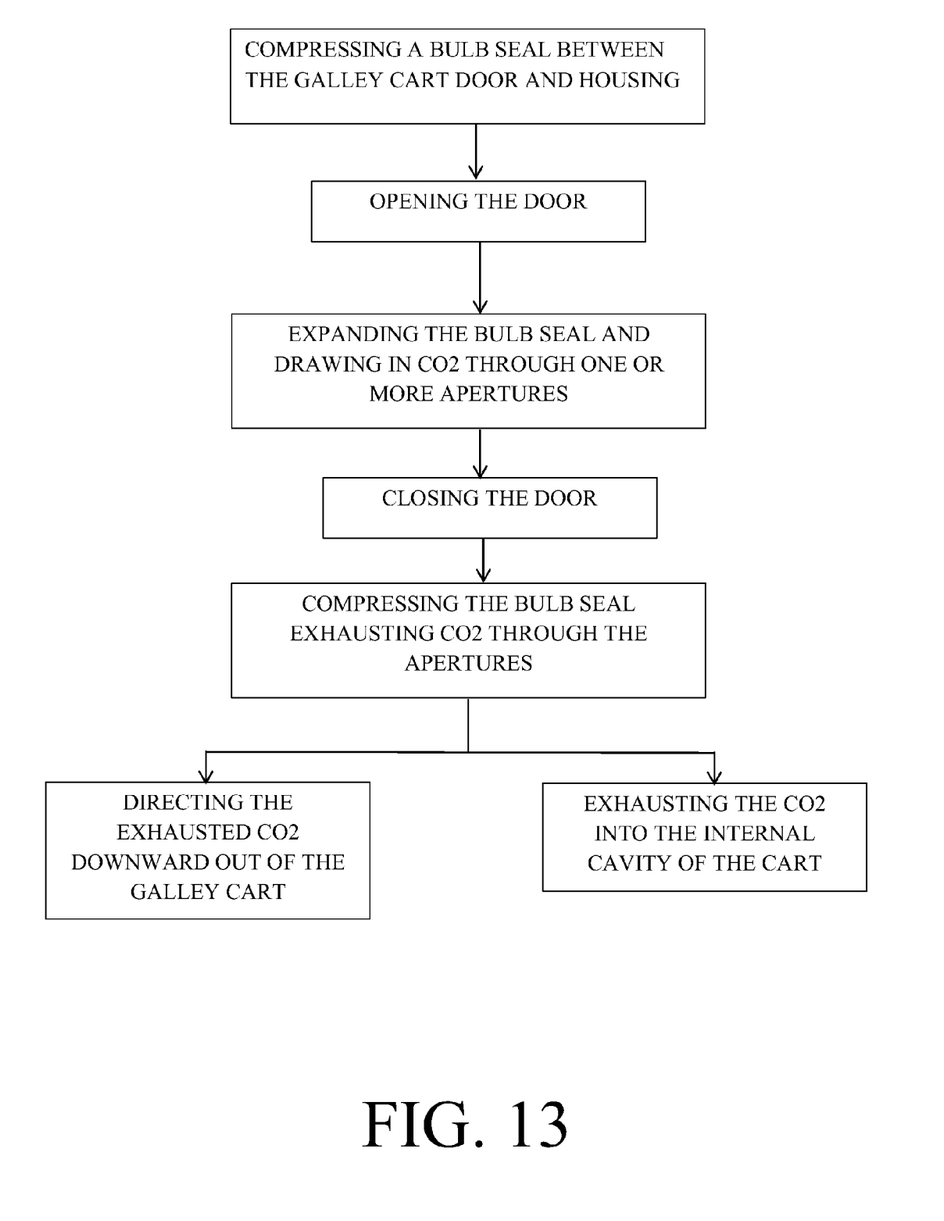

As shown in FIG. 13, the embodiments herein provide for capture of $CO_2$ gas during opening of a galley cart door and directed exhausting of the collected $CO_2$ gas upon closing the galley cart door. A bulb seal is compressed between the galley cart door and housing, step 1302. The door is opened, step 1304, expanding the bulb seal and drawing in $CO_2$ gas through one or more apertures, step 1306. Upon closing the door, step 1308, the bulb seal is compressed exhausting $CO_2$ gas, step 1310. In certain embodiments, the exhausted $CO_2$ gas is directed downward out of the galley cart, step 1312. In alternative embodiments, the $CO_2$ gas is exhausted into the internal cavity of the cart, step 1314.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A galley cart comprising:
    a housing defining a cavity;
    a door coupled to the housing, the door configured to be moved between a closed position and an open position; and
    a seal assembly coupled between the housing and the door, the seal assembly comprising at least one bulb seal configured to draw gas in when the door is moved from the closed position to the open position and to exhaust the gas when the door is moved from the open position to the closed position; said at least one bulb seal having at least one aperture proximate a bottom of the galley cart, said at least one aperture configured to exhaust and direct the gas downward.

2. The galley cart as defined in claim 1 wherein the the at least one bulb seal has a compressed position with the door closed and an expanded position with the door open, wherein the at least one bulb seal is configured to draw the gas from the within the cavity through the at least one aperture into the at least one bulb seal when the at least one bulb seal is in transition from the compressed position to the expanded position.

3. The galley cart as defined in claim 2 wherein the at least one bulb seal is configured to exhaust the gas from the within the at least one bulb seal through the at least one aperture when the at least one bulb seal is in transition from the expanded position to the compressed position.

4. The galley cart as defined in claim 3 wherein the at least one aperture is positioned to exhaust and direct the gas downward from a bottom of the housing.

5. The galley cart as defined in claim 3 wherein the at least one bulb seal is positioned to also exhaust the gas into the cavity.

6. The galley cart as defined in claim 1 wherein the door is coupled to the housing with at least one hinge mounted along a first side of the door and the at least one bulb seal is oriented vertically along a second side of the door opposite the hinge.

7. The galley cart as defined in claim 6 wherein the at least one bulb seal includes two end caps, one of the two end caps having the at least one aperture for drawing in and exhausting the gas.

8. The galley cart as defined in claim 1 further comprising a relief channel in the bottom of the galley cart in communication with the at least one aperture.

9. The galley cart as defined in claim 1 wherein the seal assembly is coupled to the housing.

10. The galley cart as defined in claim 1 wherein the seal assembly is coupled to the door.

11. The galley cart as defined in claim 1 wherein the seal assembly is mounted horizontally along a bottom edge of the door.

12. The galley cart as defined in claim 1 wherein the seal assembly incorporates a T-rib extending from the at least one bulb seal and the housing incorporates a T-slot receiving the T-rib to constrain the at least one bulb seal.

13. The galley cart as defined in claim 1 wherein the seal assembly incorporates a T-rib extending from the at least bulb seal and the door incorporates a T-slot receiving the T-rib to constrain the at the bulb seal.

14. The galley cart as defined in claim 1 wherein the seal assembly incorporates an attachment element selected from the set of a T-rib or a flat flange.

* * * * *